| United States Patent Office | 3,454,515
Patented July 8, 1969 |
|---|---|

3,454,515
SIZING COMPOSITION FOR GLASS FIBERS
Gopadi S. Hathwar, Nashville, Tenn., assignor to Ferro Corporation, Cleveland, Ohio, a corporation of Ohio
No Drawing. Filed Mar. 28, 1966, Ser. No. 537,712
Int. Cl. D06m *15/40;* C09d *5/02;* D08f *29/42*
U.S. Cl. 260—29.6     16 Claims

ABSTRACT OF THE DISCLOSURE

The compositions disclosed herein are emulsions suitable for deposing size on glass fibers, and the sized glass fibers produced thereby. The sized glass fibers, advantageously in the form of glass roving or glass mat, are particularly suitable for being impregnated with resin. The sizing is applied in the form of an aqueous emulsion comprising polyvinyl acetate, a lubricant and a coupling agent.

---

This invention relates to sizing compositions for glass fibers. More particularly it relates to a permanent sizing composition for glass roving and glass mat which is ultimately to be impregnated with resins.

It has become common practice to use glass fibers for reinforcing various types of resin compositions. The glass fibers impart improved strength to the resin composition. However, the glass surface is not itself particularly suited for forming a strong bond with the resin composition. Moreover, prior to impregnation with resin, the glass fibers are subject to fracture by abrasion with each other and by abrasion against other surfaces.

For these reasons, the glass fibers are treated with a size composition to improve the resistance of the glass fibers to abrasion and breakage and also to improve the bonding between the glass fiber and the resin.

However, in achieving lubrication or the reduction of damage by abrasion of the fibers and also improvement of the bonding between the glass fibers and the resin, the flexibility, clarity, water resistance and various other properties of the final product may be adversely affected by the size used to improve abrasion resistance and bonding. For example, in the manufacture of rods and corrugated sheet, it is desirable that the sizing composition be one which will permit the reinforcing fibers to improve the flexural strength of the resin binder and also to maintain this characteristic when the resin comes in contact with water. Therefore, it is necessary that the sizing composition and the resin are not adversely affected by water. For these reasons, sizing compositions having hydrophilic characteristics should not be used since the effect of the water on such sizes results in defective bonding and decreased flexibility and clarity.

In summary, it is desirable to provide a sizing composition which will improve the performance characteristics as well as the strength and clarity of the resin composition reinforced with glass fibers, and it is also desirable that these improved properties should not be impaired when the composition comes in contact with water.

Many size compositions have been used with glass fibers for various purposes. However, none has operated satisfactorily for the purposes described above. While polyvinyl acetate compositions have been attempted, the water resistance and also the clarity or wet-out of the resultant fiber glass-resin composition were found to be unsatisfactory.

In accordance with the present invention, it has been found that the protective colloid, such as cellulose esters or ethers, i.e. methyl cellulose, etc., polyvinyl alcohol, etc., used in keeping the polyvinyl acetate suspended in the emulsion in which it is sold has been the cause for unsatisfactory water resistance and unsatisfactory clarity in the products made from fiber glass using polyvinyl acetate compositions as the size. Consequently, it has now been found that a size for fiber glass made from a polyvinyl acetate emulsion containing no protective colloid gives a very satisfactory permanent size, which with other components as described hereinafter, gives an ultimate resin-glass fiber impregnated product of improved water resistance, good clarity or wet-out, and also improved flexural strength and bonding between glass and resin.

In addition to the polyvinyl acetate free from protective colloid, the sizing of this invention contains a lubricant, namely either hexitol, hexitan or hexide fatty acid ester or a polyoxyethylene ether or fatty acid ester thereof, and a silicon coupling agent, namely a methacrylate silicone or a vinyl silane. For specific uses of the ultimate resin-impregnated fiber glass product, it is also desirable to have an antistat or antistatic agent present in the sizing composition.

In the emulsion or solution used to apply this size to the glass fibers, the following concentrations of the various components are used:

|  | Percent by weight |
|---|---|
| Polyvinyl acetate (preferably 2–7%) | 1.5–10 |
| Lubricant | 0.2–3.0 |
| Coupling agent | 0.1–1 |
| Antistat (where used) | 0.05–1 |

The balance is water.

The polyvinyl acetate is a solid resin and for the purposes of this invention is in a very finely divided state, advantageously having a particle size of less than 0.4 micron, preferably less than 0.2 micron. In order to avoid the use of the protective colloid, it is necessary to use this very small particle size which is smaller than normally used in polyvinyl acetate emulsions stabilized with protective colloids.

While polyvinyl acetate is specified, this resin can actually be a copolymer of vinyl acetate with no more than 10% of a modifying comonomer such as methyl methacrylate, methyl acrylate, ethyl methacrylate, acrylonitrile, vinyl chloride, vinylidene chloride, etc.

Generally the polymer is available commercially as an emulsion containing about 45% solids. Emulsions of 30–55% resin concentration are also used advantageously. However, it is essential that there be no protective colloid used to stabilize the emulsion. In its place, a very small amount of a surfactant can be used and the very small particle size described above is used to avoid the need for the protective colloid.

The lubricants are incorporated mainly to provide lubricity and thereby avoid fracture or fuzz formation at the contact points of the fibers. Suitable for this purpose are:

(1) Polyoxyethylene fatty esters (fatty esters of polyethylene glycol);

(2) Fatty esters of hexitols and the cyclic derivatives thereof, namely the hexitans and hexide;

(3) Polyoxyethylene hexitol, polyoxyethylene hexitan, and polyoxyethylene hexide and the fatty esters thereof.

In the hexitol, hexide, and hexitan derivatives the exact position of the fatty acid group or the polyoxyethylene group is not critical and in many cases is not accurately known.

The fatty esters are advantageously those of fatty acids having 12–20 carbon atoms such as stearic, palmitic, oleic, lauric acids, etc. Preferably the esters have one such fatty acid group per molecule.

The polyoxyethylene portion of these compounds has the formula $HO(CH_2CH_2O)_x$— wherein $x$ has a value in the range of about 5–50. Moreover, the polyoxyethylene portion can be in one group or in several portions of the molecule, in which case the value of $x$ applies to the total of said portions.

The hexitols are illustrated by sorbitol which has the structure

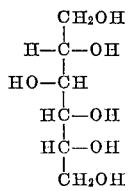

Other hexitols are mannitol and dulcitol.

Also suitable for the purpose of this invention are the cyclic ether derivatives of the hexitols such as the hexitans and hexide.

The hexitans are cyclic ethers of the hexitols and have the general formula

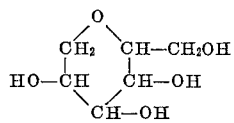

and

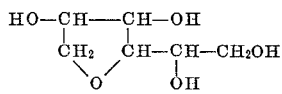

The hexide derivative has the formula

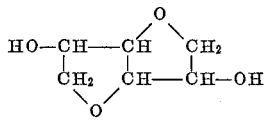

The fatty acid esters of the hexitols, hexitans and hexide, the polyoxyethylene derivatives of the hexitols, hexitans and hexide and the fatty acid esters of these polyoxyethylene derivatives can be used in the practice of this invention. As indicated elsewhere herein, the polyoxyethylene groups can be attached to more than one hydroxy group of the respective compounds.

The coupling agents facilitate the permanent adherence of the resin to the glass fibers. Preferably the coupling agent is a silicone methacrylate, but it can also be a vinyl silane. A preferred silicone methacrylate is γ-methacryloxypropyltrimethoxysilane which has the formula

The vinyl silanes can be of various alkoxy or chloro types such as vinyl trimethoxy silane, vinyl trichloro silane, vinyl methyl dichloro silane, vinyl dimethyl chloro silane, vinyl tris-(2-methoxy-ethoxy)-silane, etc. While not intending to be bound by such a theory, applicant believes that the unsaturation in the silicone coupling agents reacts with the resin to effect a substantially permanent bond, with the silicone group being strongly attached to the glass fibers by secondary bonding forces.

Where the ultimate resin-impregnated fiber glass composition is to be used for the manufacture of rods or for ultimate winding or weaving with glass roving, it is not essential to use an antistatic agent. However, if the ultimate product is to be cut, such as is the case with corrugated sheets or preformed or spray gunned mat, the function of the antistat is to eliminate static build-up and thereby facilitate or improve cutability. Various antistats are available on the market for this purpose. Preferred are the metallic silicone complexes since these give colorless products.

A typical silicone metallic complex giving colorless products is one sold under the trademark "A1702."

Where color is not a problem, a chromium methacrylate complex antistat can be used, such as the chromium methacrylate complex having the formula

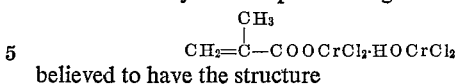

believed to have the structure

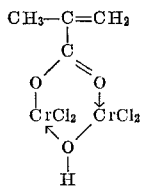

In some cases, it is desirable to have a surfactant also present in the mixture, such as those commercially available under the trademarks "Triton," "X–100," "Ethaguade C–25," "L–77," etc.

In preparing the emulsion with which the fiber glass is to be impregnated, a preferred procedure is to dissolve various components independently and then to mix the solutions before adding the polyvinyl acetate emulsion.

In a preferred procedure, the coupling agent is weighed into a container. Then an appropriate amount of water is separately adjusted to a pH of about 3.5–4. About one-third of this volume of water is added to the coupling agent and stirred until the resultant solution is clear. Then the remainder of this pH-adjusted water is added slowly to the coupling agent solution with stirring. This solution is then set aside until needed.

The lubricant is added to a separate appropriate amount of water maintained at about 175° F., the mixture stirred and then set aside until needed. Then an appropriate amount of water is added to a mixing tank, and the previously prepared coupling agent solution and lubricant solution are added thereto. Where an antistat is to be used, the appropriate amount is dissolved in water, adjusted to a pH of about 4 and added to the tank. The tank contents are then adjusted to a pH of about 6, following which the polyvinyl acetate emulsion is added. If the pH is not in the range of 4.5–6.4, it should be adjusted accordingly.

The resulting emulsion is applied to the glass fibers by various standard techniques, such as by use of a Weir applicator, or by sump applicator, etc. Then the wetted fibers are dried in an oven, at 200–300° F. for 5–10 hours, typically at 245° F. for about 8 hours. Obviously temperatures and drying periods can be adjusted to give satisfactory drying.

Likewise standard methods can be used in impregnating the fibers with resin. For example, the fibers can be cut and placed in a liquid resin-crosslinking monomer mixture before curing, or cut fibers and liquid resin simultaneously sprayed, or continuous glass roving drawn through liquid resin, etc. Resins advantageously used for this purpose are styrene-modified unsaturated alkyds, acrylic-modified unsaturated alkyds, etc.

The invention is best illurstated by the following examples. These are presented merely for illustrative purposes, and it is not intended that the scope of the invention or in the manner in which it may be practiced is to be limited in any way by these examples. Except where specifically provided otherwise, parts and percentages are by weight.

EXAMPLE I

The above general procedure is followed in preparing an emulsion having the following composition:

| | Parts |
|---|---|
| Polyvinyl acetate (45% emulsion, free of protective colloid, average particle size 0.2 micron) | 6.30 |
| Polyoxyethylene stearate ($x=40$) | 0.80 |
| γ-Methacryloxypropyltrimethoxy silane | 0.19 |
| Surfactant ("Ethaguade C–25") [1] | 0.18 |
| Water | 92.53 |

[1] This commercial product is an alkyl methyl polyethoxylated quaternary salt.

This emulsion is applied to glass fibers having a diameter of 9–20 microns while the fibers are being wound around a tube. This tube and the wound fibers are dried in an oven at about 245° F. for about 8 hours. The amount of dry size thus deposited is in the range of 0.5–1.3 percent of the total weight of fiber and size.

EXAMPLE II (a) Glass fiber roving with size applied as in Example I is woven into a fabric and a commercial polyester resin containing 60% unsaturated alkyd (maleic-ethylene glycol), 25% styrene and 15% methyl methacrylate is applied by hand lay-up. Upon curing excellent results are obtained.

(b) Glass fiber roving with size applied as in Example I is passed through liquid resin solution similar to that used in (a) and then cured to make rods continuously with excellent results.

(c) Glass fiber roving with size applied as in Example I is passed through liquid resin solution similar to that used in (a), then wound on a core to make pipe and upon curing gives excellent results.

EXAMPLE III

Example I is repeated using in addition to the reagents used there, 0.5 parts of a commercial antistat "A1702."

The resultant sized fiber glass is used in a number of tests for which the results are given below in Tables A, B and C. Table A shows the resultant properties of the resin-impregnated fiber glass composition of Example III compared with commercially available sizings I and II used in preparing corrugated sheets using in each case the same commercial polyester resin containing 60% alkyd resin (maleic-ethylene glycol) and 40% styrene monomer. Table B shows a comparison of the properties of the product from Example III and commercial products I and II used in making rods using in each case the same commercial resin (Laminac 4128). Table C shows a comparison of the resultant properties of the resin-impregnated glass roving product of Example III and commercial products I and II when used in matched die moldings using in each case the same commercial resin (Polylite Resin).

TABLE A

| Sizing | Binder content, percent | Average flexural strength [1] | | Retention, percent | Glass content, percent |
|---|---|---|---|---|---|
| | | Dry, p.s.i. | Wet, p.s.i. | | |
| Ex. III | .92 | 190,000 | 168,600 | 88.73 | 62.14 |
| Comm.-1 | .60 | 171,500 | 128,200 | 74.75 | 61.54 |
| Comm.-2 | 1.20 | 168,200 | 126,600 | 75.27 | 62.30 |

TABLE B

| Sizing | Binder content, percent | Average flexural strength [1] | | Retention, percent | Glass content, percent |
|---|---|---|---|---|---|
| | | Dry, p.s.i. | Wet, p.s.i. | | |
| Ex. III | .92 | 188,900 | 160,200 | 84.8 | 61.65 |
| Comm.-1 | .60 | 169,000 | 143,800 | 84.8 | 61.23 |
| Comm.-2 | 1.20 | 159,100 | 111,400 | 70.0 | 60.88 |

TABLE C

| Sizing | Binder content, percent | Average flexural strength [1] | | Retention, percent | Glass content, percent |
|---|---|---|---|---|---|
| | | Dry, p.s.i. | Wet, p.s.i. | | |
| Ex. III | .92 | 194,300 | 162,400 | 83.58 | 61.22 |
| Comm.-1 | .60 | 167,900 | 136,400 | 81.24 | 61.86 |
| Comm.-2 | 1.20 | 158,600 | 105,200 | 66.33 | 61.01 |

[1] Average rod flexural strength.

EXAMPLE IV

The procedures of Examples I–III are repeated three times using respectively in place of the polyvinyl acetate a corresponding amount respectively of three commercial products sold under the trademarks "National Starch 25-2823," "Tanner CF" and "Paisley Starex 75–3651" each of which is free of protective colloid. Similar results are obtained as in Example III.

EXAMPLE V

The procedures of Examples I–III are repeated four times using in place of the polyvinyl acetate of Example I an equivalent amount of four copolymers of vinylacetate containing 95% of vinylacetate and 5% methyl methacrylate, acrylonitrile, vinyl chloride and vinylidene chloride respectively. Similar results are obtained as in Examples I–III.

EXAMPLE VI

The procedures of Examples I–IV are repeated with similar results using respectively in place of the lubricant (polyoxyethylene stearate) employed in Example I, an equivalent of:

(1) a hexitan fatty ester in which the fatty acid radical has an average of about 16 carbon atoms; and (2) a polyoxyethylene hexitan fatty ester of the formula

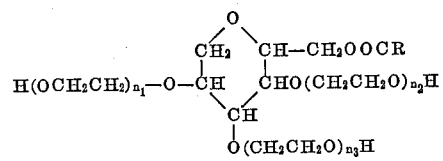

wherein the fatty R group has an average of about 16 carbon atoms and $n_1+n_2+n_3$ is about 25.

(3) the oleate ester of polyoxythylene hexitol in which $x$ has a total value of about 40;

(4) the stearyl ester of polyoxyethylene hexitan in which $x$ has a total value of about 30;

(5) the lauryl ester of polyoxyethylene hexide in which $x$ has a total value of about 50;

(6) polyoxyethylene hexitol in which $x$ has a total value of about 25;

(7) polyoxyethylene hexitan in which $x$ has a total value of about 35;

(8) polyoxyethylene hexide in which $x$ has a total value of about 45.

EXAMPLE VII

The procedures of Examples I–IV are repeated with similar results using respectively in place of the silane coupling agent used in Example I, an equivalent amount of:

(1) Vinyl tris-(2-methoxy-ethoxy)-silane;
(2) Vinyl trimethoxy silane;
(3) Vinyl trichloro silane.

While certain features of this invention have been described in detail with respect to various embodiments thereof, it will, of course, be apparent that other modifications can be made within the spirit and scope of this invention and it is not intended to limit the inventon to the exact details shown above except insofar as they are defined in the following claims:

The invention claimed is:

1. An aqueous empulsion composition adapted to deposit size on fiber glass, whereby improved clarity and water resistance are obtained when said fiber glass is impregnated with resin, consisting essentially of:

(A) 1.5–10 percent by weight of polyvinyl acetate having a particle size no greater than 0.4 micron;

(B) 0.2–3 percent by weight of a lubricant selected from the class consisting of polyoxyethylene hexitol, polyoxyethylene hexitan, polyoxyethylene hexide, the fatty acid esters of hexitol, hexitan, hexide, polyethylene glycol, polyoxyethylene hexitol, polyoxyethylene hexitan and polyoxyethylene hexide, said fatty acid esters being the esters of fatty acids having 12–20 carbon atoms and said polyoxyethylene portions of said compounds being represented by the formula $HO(CH_2CH_2O)_x-$ wherein $x$ has a value of 5–50 and the total of the $x$ values in a particular compound does not exceed 50.
(C) 0.1–1% of a coupling agent selected from the class consisting of:
   (a) γ-methacryloxypropyltrimethoxysilane,
   (b) vinyl tris-(2-methoxy-ethoxy)-silane,
   (c) vinyl trimethoxysilane,
   (d) vinyl trichloro silane,
   (e) vinyl methyl dichloro silane,
   (f) vinyl dimethyl chloro silane; and
(D) the balance of the composition being essentially water, said emulsion having a pH of 4.5–6.4.

2. The emulsion composition of claim 1 in which the amount of polyvinyl acetate is 2–7% by weight, and the polyvinyl acetate has a particle size no greater than 0.2 micron.

3. The emulsion composition of claim 2 in which said lubricant is a fatty acid ester of polyethylene glycol in which said fatty acid portion has 12–20 carbon atoms and the polyoxyethylene portion of the ester has the formula $HO(CH_2CH_2O)_x-$ wherein $x$ has a value in the range of about 5–50.

4. The emulsion composition of claim 2 in which said lubricant is polyoxyethylene hexitan.

5. The emulsion composition of claim 2 in which said lubricant is a fatty acid ester of polyoxyethylene hexitan.

6. The emulsion composition of claim 2 in which said coupling agent is γ-methacryloxypropyltrimethoxysilane.

7. The emulsion composition of claim 2 in which said coupling agent is vinyl tris-(2-methoxy-ethoxy)-silane.

8. The emulsion of claim 1 in which said composition also contains 0.05–1% by weight of an antistatic agent having the formula

9. Sized glass fiber wherein the glass fiber surfaces are coated with a thin coating consisting essentially of:
(A) 1.5–10 parts by weight of a polyvinyl acetate having a particle size no greater than 0.4 micron;
(B) 0.2–3 parts by weight of a lubricant selected from the class consisting of: polyoxyethylene hexitol, polyoxyethylene hexitan, polyoxyethylene hexide, the fatty acid esters of hexitol, hexitan, hexide, polyethylene glycol, polyoxyethylene hexitol, polyoxyethylene hexitan and polyoxyethylene hexide, said fatty acid esters being the esters of fatty acids having 12–20 carbon atoms and said polyoxyethylene portions of said compounds being represented by the formula $HO(CH_2CH_2O)_x-$ wherein $x$ has a value of 5–50 and the total of the $x$ values in a particular compound does not exceed 50.
(C) 0.01–1 parts by weight of a coupling agent selected from the class consisting of:
   (a) γ-methacryloxypropyltrimethoxysilane,
   (b) vinyl tris-(2-methoxy-ethoxy)-silane,
   (c) vinyl trimethoxysilane,
   (d) vinyl trichloro silane,
   (e) vinyl methyl dichloro silane,
   (f) vinyl dimethyl chloro silane.

10. Sized glass fiber of claim 9 in which said polyvinyl acetate is 2–7 parts by weight and has a particle size no greater than 0.2 micron.

11. Sized glass fiber of claim 10 in which said lubricant is a fatty acid ester of polyethylene glycol in which said fatty acid portion has 12–20 carbon atoms and the polyoxyethylene portion of the ester has the formula $HO(CH_2CH_2O)_x-$ wherein $x$ has a value in the range of about 5–50.

12. Sized glass fiber of claim 10 in which said lubricant is a fatty acid ester of polyoxyethylene hexitan.

13. Sized glass fiber of claim 10 in which said lubricant is polyoxyethylene hexitan.

14. Sized glass fiber of claim 10 in which said coupling agent is γ-methacryloxypropyltrimethoxysilane.

15. Sized glass fiber of claim 10 in which said coupling agent is vinyl tris-(2-methoxy-ethoxy)-silane.

16. Sized glass fiber of claim 10 in which said composition also contains 0.05–1% by weight of an antistatic agent having the formula

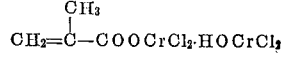

References Cited
UNITED STATES PATENTS

| | | | |
|---|---|---|---|
| 2,951,780 | 9/1960 | Bushman | 117—126 |
| 2,994,619 | 8/1961 | Eilerman | 117—126 |
| 3,082,183 | 3/1963 | Boyd | 260—29.6 |
| 3,245,938 | 4/1966 | Dennis | 260—29.6 |
| 3,261,736 | 7/1966 | Eilerman | 156—167 |

DONALD E. CZAJA, *Primary Examiner.*

R. A. WHITE, *Assistant Examiner.*

U.S. Cl. X.R.

117—124, 126; 260—861